(12) United States Patent
Choi

(10) Patent No.: US 8,311,053 B2
(45) Date of Patent: Nov. 13, 2012

(54) METHODS FOR CONTROLLING AN UPLINK SIGNAL TRANSMISSION POWER AND COMMUNICATION DEVICES

(75) Inventor: Hyung-Nam Choi, Hamburg (DE)

(73) Assignee: Infineon Technologies AG, Neubiberg (DE)

( * ) Notice: Subject to any disclaimer, the term of this patent is extended or adjusted under 35 U.S.C. 154(b) by 735 days.

(21) Appl. No.: 12/210,571

(22) Filed: Sep. 15, 2008

(65) Prior Publication Data

US 2010/0067496 A1 Mar. 18, 2010

(51) Int. Cl.
*H04B 7/212* (2006.01)
(52) U.S. Cl. .................. 370/442; 370/330; 370/345
(58) Field of Classification Search .......... 370/330, 370/345, 442
See application file for complete search history.

(56) References Cited

U.S. PATENT DOCUMENTS

| 2001/0017848 | A1 | 8/2001 | Tiedemann, Jr. | |
| 2006/0223544 | A1 | 10/2006 | Lee et al. | |
| 2007/0293260 | A1 | 12/2007 | Xiao et al. | |
| 2008/0004050 | A1 | 1/2008 | Bi et al. | |
| 2010/0099429 | A1* | 4/2010 | Ishii et al. | 455/452.1 |
| 2011/0058529 | A1* | 3/2011 | Uemura | 370/331 |
| 2011/0103338 | A1* | 5/2011 | Astely et al. | 370/329 |

FOREIGN PATENT DOCUMENTS

EP 0 993 128 A1 4/2000

OTHER PUBLICATIONS

3GPP TS 36.213 V8.4.0 (Sep. 2008); Technical Specification; 3rd Generation Partnership Project; Technical Specification Group Radio Access Network; Evolved Universal Terrestrial Radio Access (E-UTRA); Physical layers procedures (Release 8).
Huawei; "System Information Change for ETWS Message"; 3GPP Draft; R2-084307, 3rd Generation Partnership Project, 3GPP TSG RAN WG2 63, Aug. 18-22, 2008, Jeju, Korea.
3GPP TS 36.211 V8.3.0 (May 2008); Technical Specification; 3rd Generation Partnership Project; Technical Specification Group Radio Access Network; Evolved Universal Terrestrial Radio Access (E-UTRA); Physical Channels and Modulation (Release 8).
3GPP TS 36.213 V8.3.0 (May 2008); Technical Specification; 3rd Generation Partnership Project; Technical Specification Group Radio Access Network; Evolved Universal Terrestrial Radio Access (E-UTRA); Physical layer procedures (Release 8).
3GPP TS 36.300 V8.5.0 (May 2008); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).
3GPP TS 36.331 V8.2.0 (May 2008) Technical Specification; 3rd Generation Partnership Project; Technical Specification Group Radio Access Network; Evolved Universal Terrestrial Radio Access (E-UTRA); Radio Resource Control (RRC); Protocol specification (Release 8).

* cited by examiner

*Primary Examiner* — Phuc Tran
(74) *Attorney, Agent, or Firm* — Dickstein Shapiro LLP

(57) ABSTRACT

In an embodiment, a method for controlling an uplink signal transmission power in a communication device is provided. The method may include receiving a first message in a control channel modification time period, the first message including scheduling information about the timing of the transmission of a second message, the second message including an uplink signal transmission power related information, which will be transmitted by another communication device in the same control channel modification time period, controlling the communication device to receive the second message in accordance with the scheduling information, and controlling the uplink signal transmission power, which is used by the communication device for transmitting signals, depending on the uplink signal transmission power related information.

25 Claims, 10 Drawing Sheets

METHODS FOR CONTROLLING AN UPLINK SIGNAL TRANSMISSION POWER AND COMMUNICATION DEVICES

TECHNICAL FIELD

Embodiments relate to methods for controlling an uplink signal transmission power and to communication devices.

BACKGROUND

A current topic in the 3GPP (Third Generation Partnership Project) standardization groups is the further development of UMTS (Universal Mobile Telecommunications System) towards a mobile radio communication system optimized for packet data transmission by improving the system capacity and the spectral efficiency. In 3GPP, the activities in this regard are summarized under the general term LTE for "Long Term Evolution". The aim is amongst others to increase the maximum net transmission rate significantly in future, namely to 300 Mbps in the downlink transmission direction and to 75 Mbps in the uplink transmission direction.

For the transmission of data in uplink transmission direction, a closed-loop power control is conventionally carried out for the physical channels PUSCH (Physical Uplink Shared Channel) and PUCCH (Physical Uplink Control Channel), i.e. the eNodeB (evolved NodeB) transmits TPC (Transmit Power Control) commands to the UE (User Equipment) on which the transmit power of PUSCH and PUCCH in a subframe are adjusted. Main purposes of the uplink transmission direction closed-loop power control are usually to compensate path-loss and achieve a given SINR (Signal-to-Interference Noise Ratio) target for the respective physical channels.

In fact, the setting of the UE transmit power for PUSCH and PUCCH transmission in a subframe does not only depend on the TPC command but may also depend on mobile radio cell-specific and UE-specific parameters. The cell-specific parameters are usually broadcast by an eNodeB to all UEs in a mobile radio cell via system information. The UE-specific parameters are signaled by an eNodeB to a UE in a dedicated RRC (Radio Resource Control) message, e.g. during channel establishment procedure.

Regarding the cell-specific power control parameters, there may be an issue if these parameters need to be updated, e.g. due to adaptation of the uplink transmission direction power control operation by the communication network depending on the traffic load in the mobile radio cell. However, the current mechanism for notification and update of system information as specified is inefficient for uplink transmission direction power control purposes as the duration between the decision by the communication network to change the system information and its usage can be relatively long. Thus, for a relatively long time, uplink transmission direction power control operation may be performed based on outdated parameters that would result in severe performance degradation in the uplink.

Therefore, there is a need for an optimization of the current mechanism for notification and update of uplink transmission direction power control related system information.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
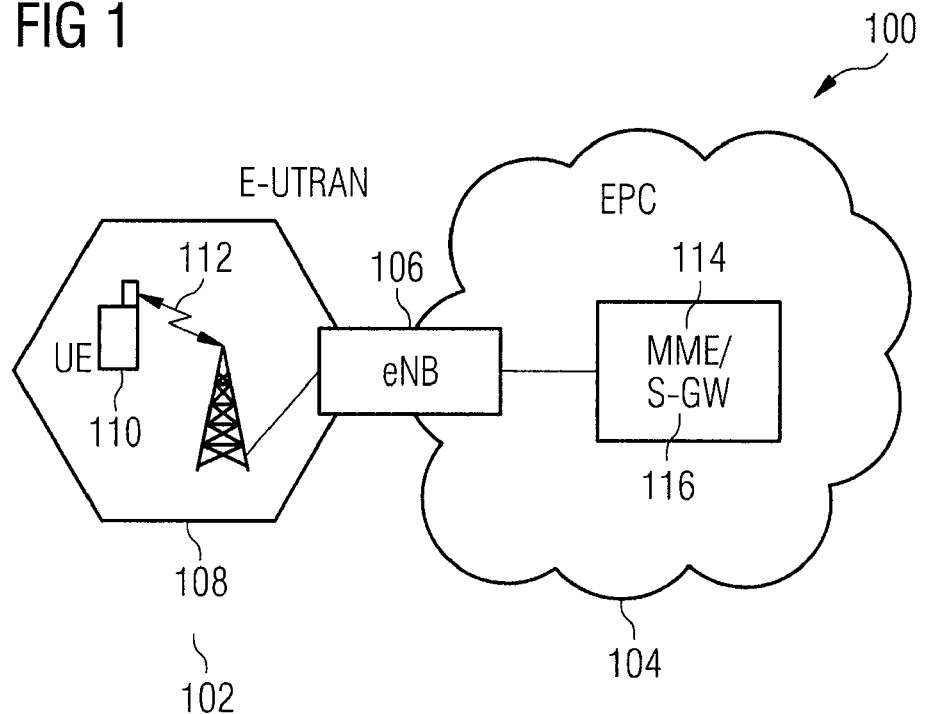
FIG. 1 shows a communication system in accordance with an embodiment.

FIG. 1 shows a communication system 100 in accordance with an embodiment. In this embodiment, the high-level network architecture of LTE including the radio access network E-UTRAN (Evolved UMTS Terrestrial Radio Access Network) 102 and the core network EPC (Evolved Packet Core) 104 are shown. However, in alternative embodiments, other types of communication systems in accordance with another communication standard may be provided. In an embodiment, the E-UTRAN 102 may consist of base transceiver stations eNodeB (eNBs) 106. Each eNB 106 may provide radio coverage for one or more mobile radio cells 108 within the E-UTRAN 102. Control and user data may be transmitted between a respective eNB 106 and a communication terminal device, e.g. a mobile radio communication terminal device such as e.g. a so-called User Equipment (UE) 110 located in a mobile radio cell 108 over an air interface 112 on the basis of a multiple access method. For LTE, new multiple access methods have been specified. For the downlink transmission direction (downlink transmission direction: e.g. signal transmission direction from an associated respective mobile radio base station to a mobile radio terminal device) OFDMA (Orthogonal Frequency Division Multiple Access) in combination with TDMA (Time Division Multiple Access) will usually be used. OFDMA in combination with TDMA, subsequently also called OFDMA/TDMA, is a multicarrier multiple access method, in which a subscriber is provided with a defined number of sub-carriers (also referred to as sub-carrier frequencies in the following) in the frequency spectrum and a defined transmission time for the purpose of data transmission. Uplink data transmission (uplink transmission direction: e.g. signal transmission from a mobile radio terminal device to an associated respective mobile radio base station) is usually based on SC-FDMA (Single Carrier Frequency Division Multiple Access) in combination with TDMA.

The eNBs 106 are connected to the EPC (Evolved Packet Core) 104, more specifically to an MME (Mobility Management Entity) 114 and to a Serving Gateway (S-GW) 116. The MME 114 is responsible for controlling the mobility of UEs 110 located in the mobile radio coverage area of the E-UTRAN 102, while the S-GW 116 is responsible for handling the transmission of user data between a UE 110 and the communication network such as e.g. the EPC 104.

In an embodiment, in accordance with LTE, the following types of duplexing methods may be supported: full-duplex FDD (Frequency Division Duplex), half-duplex FDD and TDD (Time Division Duplex). Full-duplex FDD may use two separate frequency bands for uplink signal transmissions and downlink signal transmissions, and both signal transmissions can occur simultaneously. Half-duplex FDD may also use two separate frequency bands for uplink signal transmissions and downlink signal transmissions, but both signal transmissions are non-overlapping in time. TDD may use the same frequency band for signal transmission in both uplink signal transmissions and downlink signal transmissions. Within a time frame, the direction of transmission may be switched alternatively between downlink and uplink.

Figure 2:
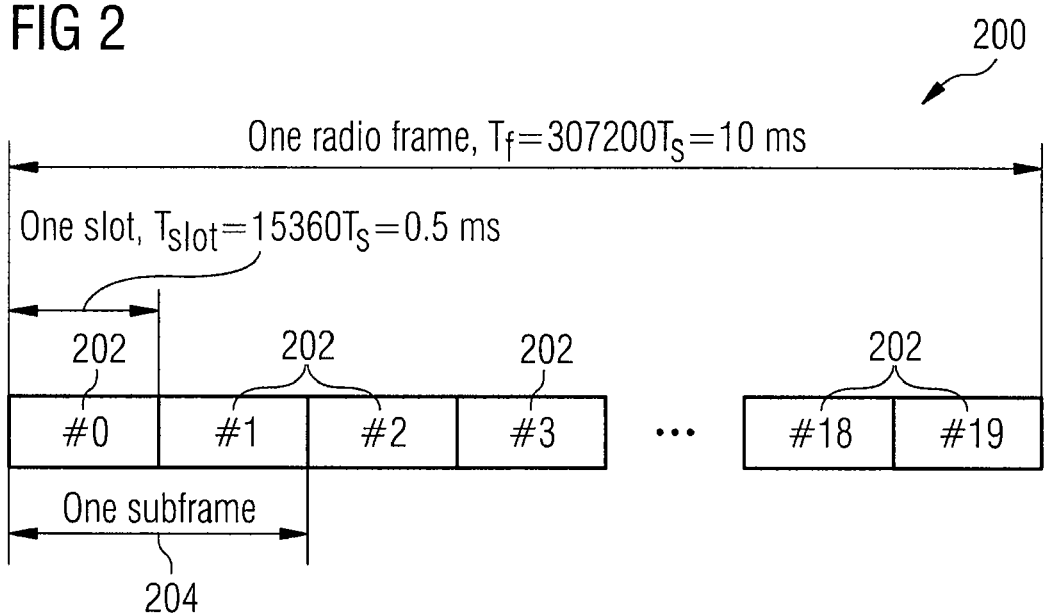
FIG. 2 shows a time frame structure type 1 in accordance with an embodiment.

Time frame structure type 1 200 as shown in FIG. 2 is in an embodiment applicable to both full-duplex and half-duplex FDD. Each radio frame is 10 ms long (i.e. radio frame time duration $T_f=307200*T_s=10$ ms (with $T_s=3.25521*10^{-8}$ s) and may consist of 20 time slots 202, each time slot 202 having a length of 0.5 ms, numbered from 0 to 19 in FIG. 2. A subframe 204 may be defined as two consecutive time slots 202. For FDD, 10 subframes 204 may be available for downlink signal transmission and 10 subframes 204 may be available for uplink signal transmissions in each 10 ms time interval. Uplink signal transmissions and downlink signal transmissions may be separated in the frequency domain. Depending on the time slot format, a subframe 204 may consist of 14 or 12 OFDMA symbols in DL (downlink signal transmission) and 14 or 12 SC-FDMA symbols in UL (Uplink signal transmission), respectively.

Due to the TDMA component of the LTE multiple access schemes in UL and DL, in accordance with an embodiment, so-called timing advance (TA) adjustments for the uplink signal transmissions take place with the aim that a signal transmitted from a UE 110 arrives at the base transceiver station (e.g. the eNodeB 106) according to the determined frame/subframe timing and does not interfere with the signal transmission of other UEs (not shown in the figures for reasons of clarity). A timing advance value may correspond to the length of time a UE 110 should advance its timing of UL signal transmission. The timing advance value may be sent by the eNodeB 106 to UE 110 according to the perceived propagation delay of UL signal transmissions.

Figure 3:
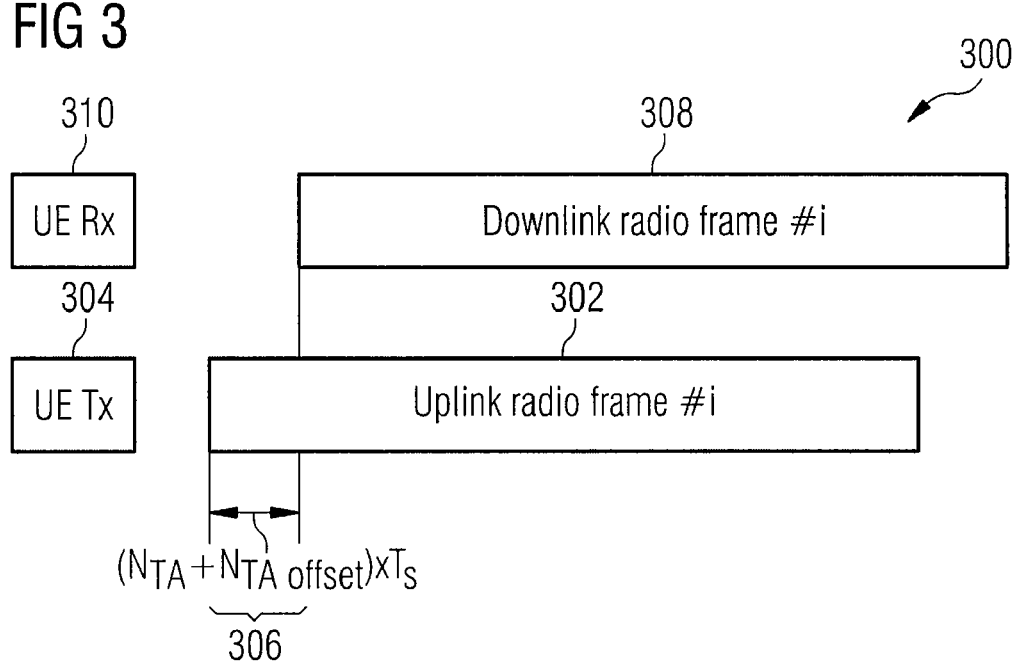
FIG. 3 shows the Uplink-Downlink frame timing for FDD in accordance with an embodiment.

FIG. 3 shows the UL-DL frame timing for FDD in a block diagram 300. The start of the signal transmission of an uplink (UL) radio frame number #i 302 from the UE (referred to as UE transmitter Tx 304) shall start a predefined time interval 306 of length $((N_{TA}+N_{TA\ offset})*T_s)$ seconds before the start of the receiving of the corresponding downlink (DL) radio frame number #i 308 at the UE (referred to as UE receiver Rx 310), where $N_{TA\ offset}=0$ for full-duplex FDD and $N_{TA\ offset}=614$ for half-duplex FDD. For $N_{TA}$, the following minimum and maximum values may apply: $N_{TA,min}=0$, $N_{TA,max}=20490$, i.e. in case of full-duplex FDD the maximum timing advance is $N_{TA,max}*T_s \approx 0.67$ ms with $T_s=10$ ms/307200=32.55 ns.

Figure 4:
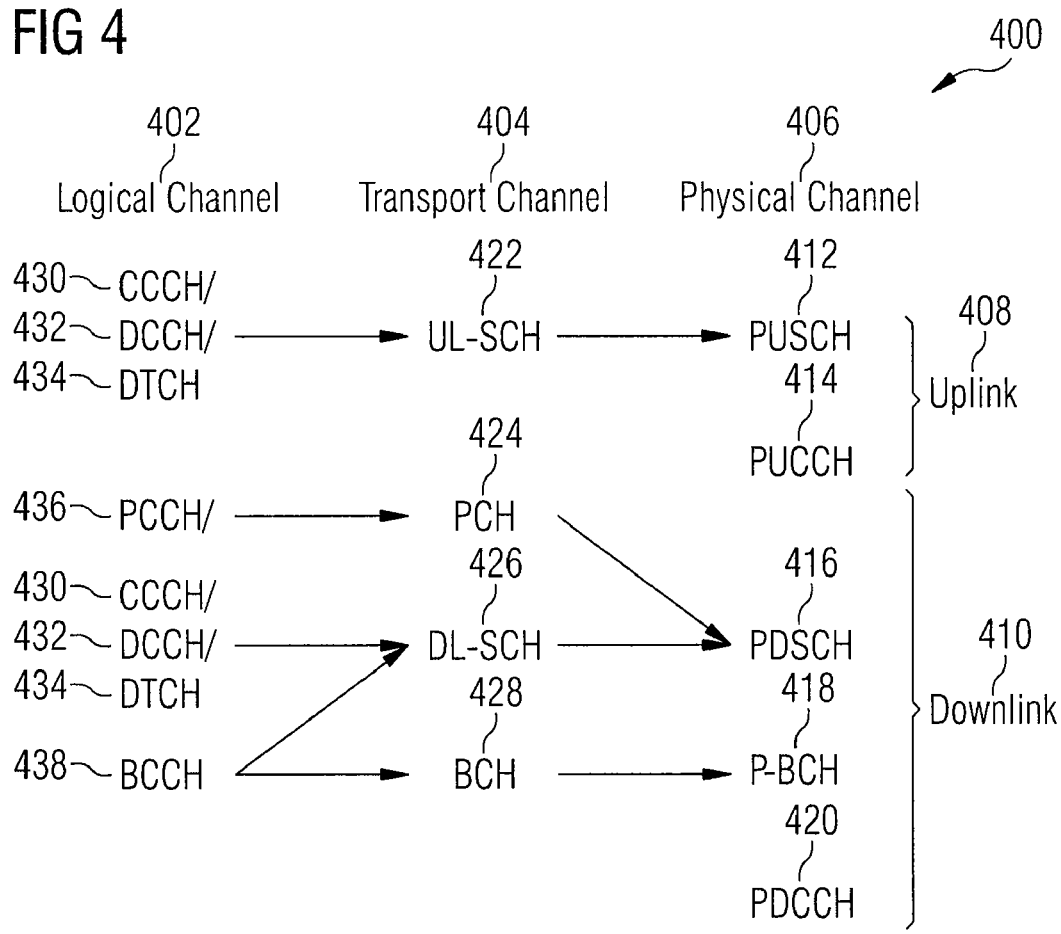
FIG. 4 shows a diagram illustrating various communication channels in accordance with an embodiment.

FIG. 4 shows a diagram 400 illustrating various communication channels in accordance with an embodiment as will be described in more detail below.

In more detail, as shown in FIG. 4, in an embodiment, various logical channels 402, transport channels 404, and physical channels 406 may be provided for uplink signal transmission (in FIG. 4 symbolized by means of reference number 408) and downlink signal transmission (in FIG. 4 symbolized by means of reference number 410), respectively.

In an embodiment, the following physical channels 406 may be provided:

Physical Uplink Shared Channel (PUSCH), designated with reference number 412;
Physical Uplink Control Channel (PUCCH), designated with reference number 414;
Physical Downlink Shared Channel (PDSCH), designated with reference number 416;
Physical Broadcast Channel (P-BCH), designated with reference number 418; and
Physical Downlink Control Channel (PDCCH), designated with reference number 420.

Some characteristics of the respective physical channels 406 will be described in more detail below.

The PUSCH 412 exists in uplink signal transmission and carries user data and control data on the Uplink Shared Channel (UL-SCH) 422 as one of the provided transport channels 404. In an embodiment, the following logical channels 402 may be mapped to the UL-SCH 422: the Common Control Channel (CCCH) 430, the Dedicated Control Channel (DCCH) 432, and the Dedicated Traffic Channel (DTCH) 434. In an embodiment, the PUSCH 412 may be power-controlled by a mobile radio base station such as e.g. by an eNodeB 106.

The PUCCH 414 is an uplink physical channel only, i.e. no logical and transport channels are mapped to this channel PUCCH 414. The PUCCH 414 may carry the control information such as HARQ ACK/NAKs (Hybrid Automatic Repeat Request Acknowledgement/Negative Acknowledgement) in response to downlink signal transmissions on the PDSCH 416, scheduling requests and Channel Quality Indicator (CQI) reports. In an embodiment, the PUCCH 414 may be power-controlled by a mobile radio base station such as e.g. by an eNodeB 106.

The PDSCH 416 exists in downlink signal transmission and carries user data and control data on the transport channel 404 Downlink Shared Channel (DL-SCH) 426 and paging messages on the transport channel 404 Paging Channel (PCH) 424. In an embodiment, the following logical channels 402 may be mapped to the DL-SCH 426: the Broadcast Control Channel (BCCH) 438, the Common Control Channel (CCCH) 430, the Dedicated Control Channel (DCCH) 432, and the Dedicated Traffic Channel (DTCH) 434. In an embodiment, the logical channel 402 Paging Control Channel (PCCH) 436 may be mapped to the PCH 424. In an embodiment, the PDSCH 416 may occupy the OFDMA symbols in a subframe not occupied by the PDCCH 420.

The PDCCH 420 is a downlink physical channel only, i.e. no logical and transport channels are mapped to this channel PDCCH 420. In an embodiment, the PDCCH 420 may carry the control information related to downlink signal transmissions such as resource allocation of the PCH 424 and the DL-SCH 426. In an embodiment, the PDCCH 420 may carry the control information related to uplink signal transmissions such as resource allocation of UL-SCH 422, TPC (Transmit Power Control) commands for PUCCH 414 and PUSCH 412. Due to the different types of control information to be transmitted, the control information may be grouped into so-called DCI (Downlink Control Information) formats, e.g. PDCCH 420 with DCI format #0 may be used for the scheduling of PUSCH 412, and the DCI formats #3/3A may be used for the transmission of TPC commands for PUCCH 414 and PUSCH 412 (either with 2-bit or 1-bit power adjustments). The PDCCH 420 may occupy one, two, or three OFDMA symbols in the first time slot in a subframe. The number of OFDMA symbols may dynamically be adjusted by the communication network.

The P-BCH 418 is a downlink channel carrying system information on the Broadcast Channel (BCH) 428 to be broadcast in the respective mobile radio cell, e.g. mobile radio cell 108. In an embodiment, the logical channel 402 Broadcast Control Channel (BCCH) 438 may be mapped to the BCH 428.

Figure 5:
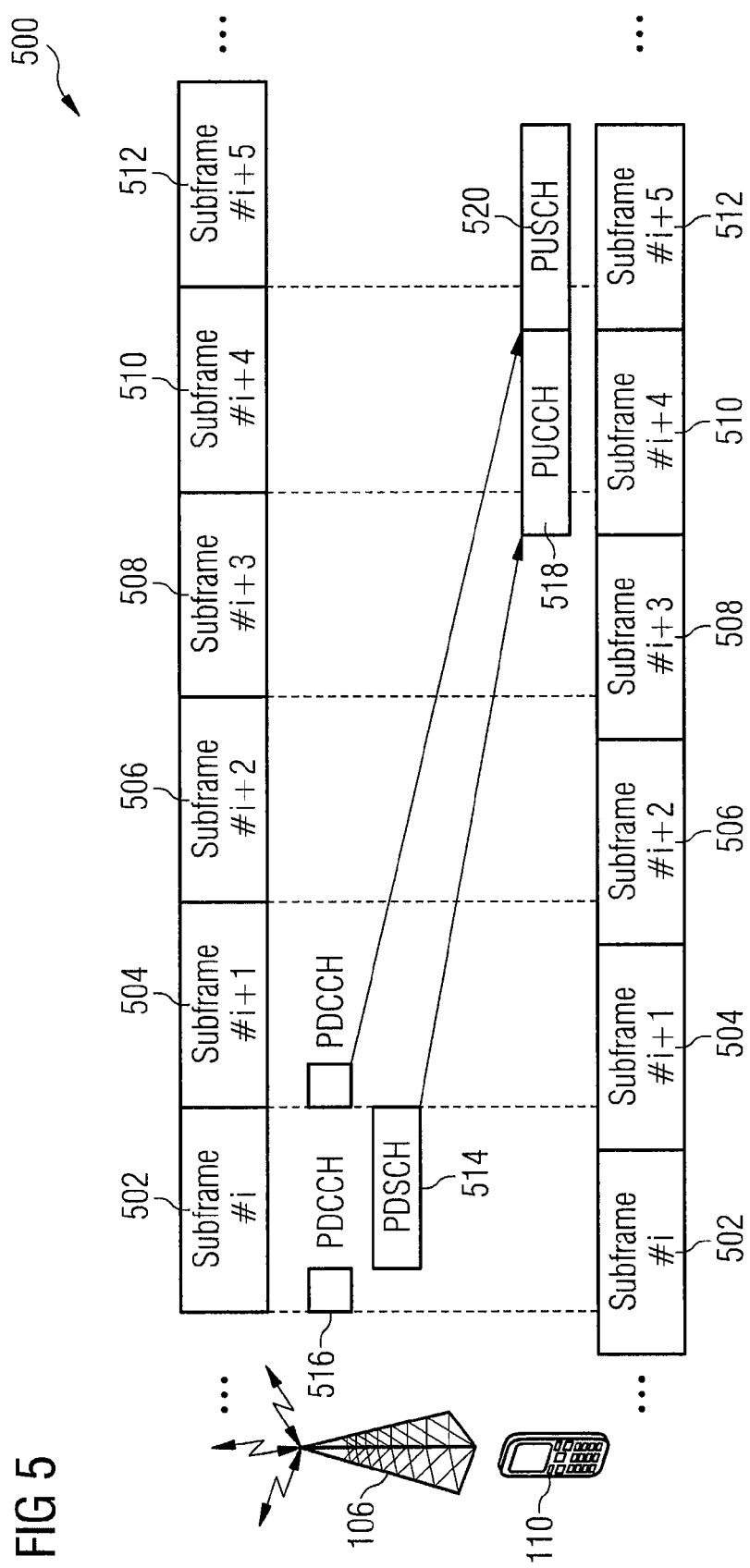
FIG. 5 shows an UL-DL transmission timing relationship that may apply for FDD in accordance with an embodiment.

In an embodiment, in which the communication system 100 is an LTE communication system 100, the following UL-DL transmission timing relationship may apply for FDD as illustrated in a diagram 500 in FIG. 5 (wherein six subframes 502, 504, 506, 508, 510, 512 are shown):

In an embodiment, the UE 110 shall upon detection of a PDSCH transmission 514 in a first subframe #i 502 intended for the UE 110 (indicated by preceding PDCCH transmission 516) and for which an HARQ ACK/NACK shall be provided, transmit the ACK/NACK response message 518 in a fifth subframe #i+4 510, e.g. on the PUCCH 414.

The UE 110 shall upon detection of a PDCCH transmission 516 with DCI format 0 in the second subframe #i+1 504 intended for the UE 110, adjust the corresponding PUSCH transmission 520 in the sixth subframe #i+5 512 according to the PDCCH information 516.

In the following, the power control for the PUSCH 412 and the PUCCH 414 in FDD will be described in more detail.

The setting of the UE 110 transmit power $P_{PUSCH}$ for the physical uplink shared channel (PUSCH) 412 transmission in a subframe #i may be defined by $$P_{PUSCH}(i)=\min\{P_{MAX}, 10\log_{10}(M_{PUSCH}(i))+P_{O\_PUSCH}(j)+\alpha \cdot PL+\Delta_{TF}(i)+f(i)\}[dBm].$$

The description of each parameter in the above PUSCH formula is summarized in table 1.

TABLE 1

Description of the parameters for the power control of PUSCH

| Parameter | Description | Signalling |
|---|---|---|
| $P_{MAX}$ | Maximum allowed power that depends on the UE power class | Not signalled |
| $M_{PUSCH}(i)$ | Size of the PUSCH transmission resource assignment (#RBs) valid for subframe i | Signalled on PDCCH DCI format #0 in subframe #i-4 |
| $P_{O\_PUSCH}(j)$ | Composed of the sum of Cell-specific parameter $P_{O\_NOMINAL\_PUSCH}(j)$ UE specific component $P_{O\_UE\_PUSCH}(j)$ | $P_{O\_NOMINAL\_PUSCH}(j)$ is broadcast on SIB Type 2 $P_{O\_UE\_PUSCH}(j)$ is signalled dedicated to a UE |

TABLE 1-continued

Description of the parameters for the power control of PUSCH

| Parameter | Description | Signalling |
|---|---|---|
| α | cell specific path loss compensation factor | Is broadcast on SIB Type 2 |
| PL | DL pathloss estimate calculated in UE, derived from RSRP measurement and signaled RS Tx power | Not signalled |
| $\Delta_{TF}(i)$ | PUSCH transport format specific offset | Not signalled |
| f(i) | PUSCH power control adjustment state in subframe #i and depends on $\delta_{PUSCH}$ which is a UE specific correction value, also referred to as a TPC command If accumulation of TPC commands is applied, then f(i) is given by f(0) = 0 and f(i) = f(i − 1) + $\delta_{PUSCH}$(i − $K_{PUSCH}$) If absolute TPC commands is applied, then f(i) is given by f(i) = $\delta_{PUSCH}$(i − $K_{PUSCH}$) The value of $K_{PUSCH}$ is 4 and $\delta_{PUSCH}$(i − $K_{PUSCH}$) is the TPC command signaled at subframe #(i − $K_{PUSCH}$) | TPC command $\delta_{PUSCH}$ is signaled on PDCCH DCI format #0, 3, 3A |

The setting of the UE 110 transmit power $P_{PUCCH}$ for the physical uplink control channel (PUCCH) transmission in a subframe #i may be defined by $$P_{PUCCH}(i)=\min\{P_{MAX}, P_{O\_PUCCH}+PL+\Delta_{F\_PUCCH}(F)+g(i)\}[dBm].$$

The description of each parameter in the above PUCCH formula is summarized in table 2.

TABLE 2

Description of the parameters for the power control of PUCCH

| Parameter | Description | Signalling |
|---|---|---|
| $P_{MAX}$ | Maximum allowed power that depends on the UE power class | Not signalled |
| $P_{O\_PUCCH}$ | Composed of the sum of Cell-specific parameter $P_{O\_NOMINAL\_PUCCH}$ UE specific component $P_{O\_UE\_PUCCH}$ | $P_{O\_NOMINAL\_PUCCH}$ is broadcast on SIB Type 2 $P_{O\_UE\_PUCCH}$ is signalled dedicated to a UE |
| PL | DL pathloss estimate calculated in UE, derived from RSRP measurement and signaled RS Tx power | Not signalled |
| $\Delta_{F\_PUCCH}(F)$ | PUCCH format specific offset | Is broadcast on SIB Type 2 |
| g(i) | PUCCH power control adjustment state in subframe #i and depends on $\delta_{PUCCH}$ which is a UE specific correction value, also referred to as a TPC command Only accumulation of TPC commands is applied, then g(i) is given by g(0) = 0 and g(i) = g(i − 1) + $\delta_{PUCCH}$(i − $K_{PUCCH}$) The value of $K_{PUCCH}$ is 4 and $\delta_{PUCCH}$(i − $K_{PUCCH}$) is the TPC command signaled at subframe #(i − $K_{PUCCH}$) | TPC command $\delta_{PUCCH}$ is signaled on PDCCH DCI format #1, 1A, 1B, 2, 2A, 3, 3A |

In an embodiment, TPC commands may be transmitted to a UE 110 over different types of PDCCHs 420 as summarized in table 3.

TABLE 3

PDCCH formats for transmission of TPC commands

| PDCCH formats | TPC command | PUSCH | PUCCH |
|---|---|---|---|
| DCI format 0 | UE-specific, 2-bit TPC command | X | |
| DCI format 1/1A/1B | UE-specific, 2-bit TPC command | | X |
| DCI format 2/2A | UE-specific, 2-bit TPC command | | X |
| DCI format 3 | UE group, 2-bit TPC command, TPC bitmap (TPC command number 1, TPC command number 2, . . . , TPC command number N) | X | X |
| DCI format 3A | UE group, 1-bit TPC command, TPC bitmap (TPC command number 1, TPC command number 2, . . . , TPC command number M) | X | X |

In a cellular mobile radio communication system such as GSM (Global System for Mobile Communications) or UMTS, e.g. in a cellular mobile radio communication system 100 in accordance with an embodiment, important system-specific and cell-specific parameters may be broadcast to all UEs 110 in a mobile radio cell 108 as system information.

In LTE this may be done using
  the Broadcast Control Channel (BCCH) 438 as a logical channel 402, which is mapped onto the Broadcast Channel (BCH) 428 as a transport channel 404 and is physically sent on the Physical Broadcast Channel (P-BCH) 418 as a physical channel 406 via the air interface;
  the Broadcast Control Channel (BCCH) 438 as a logical channel 402, which is mapped onto the Downlink Shared Channel (DL-SCH) 426 as a transport channel 404 and is physically sent on the Physical Downlink Shared Channel (PDSCH) 416 as a physical channel 406 via the air interface.

Overall, a large amount of system information is transmitted to all UEs 110 located in a respective mobile radio cell 108. According to the nature of this information, this information may be grouped into various blocks. The current structure in LTE looks as follows:
  Master Information Block (MIB): contains a limited number of most essential and frequently transmitted parameters to acquire other information from the cell, e.g. System Frame Number (SFN), DL bandwidth information; the system frame number indicates the timing used in the mobile radio cell 108 and serves for the synchronization of data transmission.
  System Information Block Type 1 (SIB Type 1): contains information relevant when evaluating if a UE 110 is allowed to access a mobile radio cell 108, and scheduling as well as mapping information for other SIB types.
  System Information Block Type 2 (SIB Type 2): contains common and shared channel information, e.g. random access parameters, default paging cycle, BCCH 438 modification period coefficient, uplink power control parameters, configuration of PUCCH 414 and PUSCH 412.
  System Information Block Type 3 (SIB Type 3): contains mobile radio cell 108 re-selection information, mainly related to the serving cell.
  System Information Block Type 4 (SIB Type 4): contains information about the serving frequency and intra-frequency neighbouring mobile radio cells relevant for mobile radio cell re-selection.
  System Information Block Type 5 (SIB Type 5): contains information about other E-UTRA frequencies and inter-frequency neighbouring mobile radio cells relevant for mobile radio cell re-selection.
  System Information Block Type 6 (SIB Type 6): contains information about UTRA frequencies and UTRA neighbouring mobile radio cells relevant for mobile radio cell re-selection.
  System Information Block Type 7 (SIB Type 7): contains information about GERAN (GSM/EDGE (Enhanced Data Rates for GSM Evolution)) frequencies relevant for mobile radio cell re-selection.
  System Information Block Type 8 (SIB Type 8): contains information about CDMA2000 (Code Division Multiple Access 2000) frequencies and CDMA2000 neighbouring mobile radio cells relevant for mobile radio cell re-selection.

In an embodiment, the MIB may be transmitted on the P-BCH 418, whereas the SIB Types 1 to 8 may be transmitted on the PDSCH 416. The SIBs may be transmitted in the mobile radio cell with a definite periodicity. The MIB may use a fixed schedule with a periodicity of 40 ms and repetitions made within 40 ms. The first transmission of the MIB is scheduled in the first subframe #0 502 of radio frames for which the SFN mod 4=0, and repetitions are scheduled in the first subframe #0 502 of all other radio frames. The SIB Type 1 may use a fixed schedule with a periodicity of 80 ms and repetitions made within 80 ms. The first transmission of SIB Type 1 is scheduled in a sixth subframe #5 of radio frames for which the SFN mod 8=0, and repetitions are scheduled in the sixth subframe #5 of all other radio frames for which SFN mod 2=0. All other SIB Types (i.e. 2 to 8) may be transmitted within periodically occurring time domain windows of length [1, 2, 5, 10, 15, 20] ms. The periodicity may be in the value range=[80, 160, 320, 640, 1280, 2560, 5120] ms.

Using the system information the UE 110 can determine whether it is allowed to camp on the mobile radio cell 108 and may for example determine the radio resources for sending data using the air interface. As system information changes may occur due to adaptation of mobile radio cell configuration depending on the traffic load in the mobile radio cell, the UEs 110 are basically configured to acquire and store only "valid" (i.e. latest versions of) system information. In accordance with an embodiment, in LTE the, notification and update of system information is based on so-called "BCCH modification periods", i.e. system information changes only occur at specific radio frames.

Figure 6:
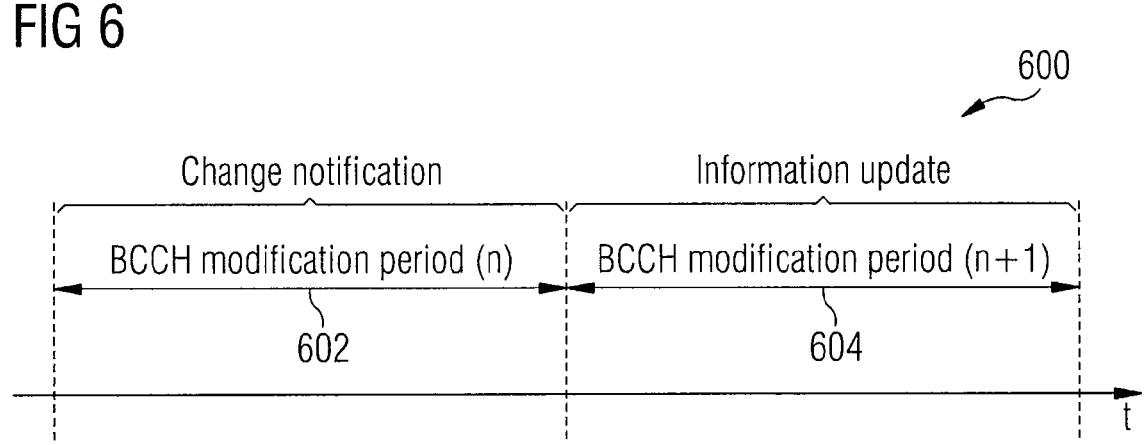
FIG. 6 shows the notification and update of system information.

The modification period boundaries are defined by SFN mod N. N is the Modification period length and may be configured by the system information. When the communication network changes (some of the) system information, it may first notify the UEs 110 by a paging message including the systemInfoModification indication within a modification period(n) 602. During the modification period(n) 602, the system information is transmitted as defined by its scheduling. In the next modification period(n+1) 604, the communication network may transmit the updated system information. These general principles are illustrated in a timing diagram 600 in FIG. 6. Upon receiving a change notification, the UE 110 knows that the current system information is valid until the next modification period boundary. After this boundary, the UE 110 acquires the new system information. If no paging message is detected during the modification period(n) 602, or the systemInfoModification indication is not included in the message, UE 110 may assume that no change of system information will occur in the next modification period(n+1) 604. The length of the modification period N can be relatively long (i.e. in worst case 20 s) as it is given by following formula:

Modification period length=modificationPeriodCoeff× defaultPagingCycle

In an embodiment, the modificationPeriodCoeff can take the values [1, 2, 4, 8], and the defaultPagingCycle can take the values [320, 640, 1280, 2560] ms. Both parameters may be signaled on SIB Type 2.

In view of the above facts it can be stated that the conventional mechanism for notification and update of system information is rather inefficient for uplink power control purposes, for example due to following reasons:

The duration between the decision by the communication network to change the system information and its usage is in the range of 2*Modification period length, i.e. in worst case it will last 40 s. Thus, for a relatively long time, uplink power control operation will be performed based on outdated parameters that would result in severe performance degradation in the uplink.

Although the UE 110 is informed about changes in the system information, no further details are usually provided e.g. regarding which system information has changed.

Figure 7:
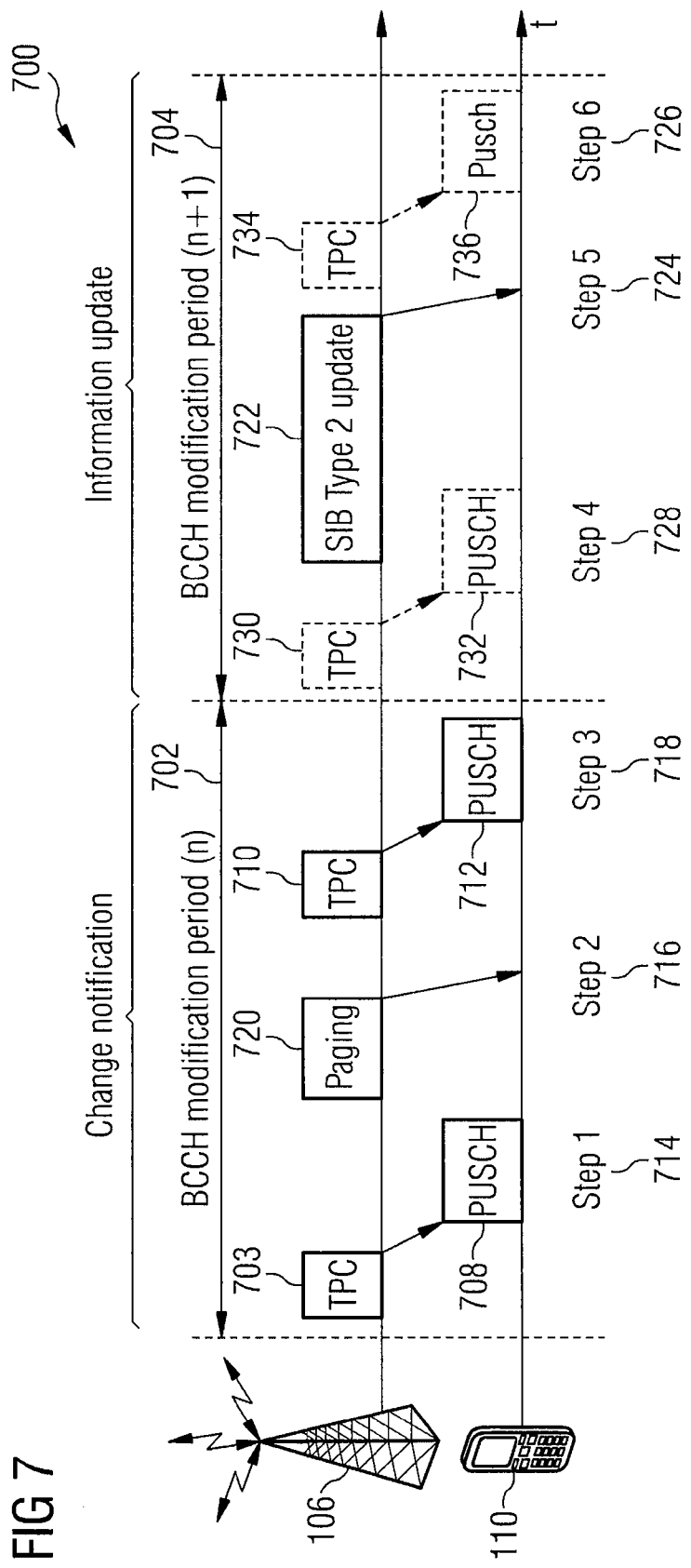
FIG. 7 shows the interaction between notification and update of SIB Type 2 and UL power control for PUSCH.

In an embodiment, there is provided an optimization of the conventional mechanism for notification and update of uplink power control related system information. The following parameters for PUSCH 412 and PUCCH 414 are cell-specific and are broadcast on SIB Type 2: $P_{O\_NOMINAL\_PUSCH}(j)$, $\alpha$, $P_{O\_NOMINAL\_}PUCCH$, $\Delta_{F\_PUCCH}(F)$. For illustration, an exemplary interaction between notification and update of SIB Type 2 and uplink power control for PUSCH is depicted in a message flow diagram 700 FIG. 7:

In the modification period(n) 702, power control for PUSCH transmission of UE 110 may be performed (step 1 (denoted with reference number 714) (in step 1, a first TPC command message 706 is transmitted from the eNodeB 106 to the UE 110, and the UE 110 uses the information included in the first TPC command message 706 for a first PUSCH transmission 708) and step 3 (denoted with reference number 718) (in step 3, a second TPC command message 708 is transmitted from the eNodeB 106 to the UE 110, and the UE 110 uses the information included in the second TPC command message 710 for a second PUSCH transmission 712)) based on currently valid system information stored in the UE 110. In addition, the communication network notifies the UE 110 in step 2 (denoted with reference number 716) by a paging message 720 including the systemInfoModification indication about a change of system information, but without any indication which system information has changed.

In the modification period(n+1) 704, the communication network, e.g. the eNodeB 106, transmits the changed system information, e.g. the uplink power control related system information in SIB Type 2 722.

The UE 110 acquires the new system information in SIB Type 2 722 in step 5 (denoted with reference number 724) and applies the updated information as fast as possible, e.g. in step 6 (denoted with reference number 726 (in step 6, a fourth TPC command message 734 may be transmitted from the eNodeB 106 to the UE 110, and the UE 110 may use the information included in the fourth TPC command message 734 for a fourth PUSCH transmission 736)) or in the next modification period(n+2) (not shown in FIG. 7) at the latest.

In the modification period(n+1) 704, power control for PUSCH transmission of the UE 110 can be performed based on current valid system information stored in the UE 110 as long as the changed system information has not been acquired (see step 4 (denoted with reference number 728) (in step 4, a third TPC command message 730 is transmitted from the eNodeB 106 to the UE 110, and the UE 110 uses the information included in the third TPC command message 730 for a third PUSCH transmission 732)).

In various embodiments, a solution for the notification and update of uplink power control related system information is provided. The provided solution may include one or more of the following embodiments:

For the paging of the change of uplink power control related system information, cell-specific paging occasions may be defined within the length of a single BCCH modification period and all UEs 110 may check the PDCCH at the specified time instants. One uplink power control related paging occasion (PO) is a radio frame where there may be the PUCCH transmitted addressing the paging message and is given by SFN mod T. The value T may be configured by the communication network, e.g. by the eNodeB 106 (in general, by an associated mobile radio base station) and signaled via system information.

In the paging message a new information element is introduced referred to as systemInfoModificationUL-PC for indicating the change of uplink power control related system information.

Further, the paging message may carry the scheduling information of the uplink power control related system information to be updated.

The updated uplink power control related system information is transmitted on DL-SCH/PDSCH in accordance with the scheduling information and in the same BCCH modification period as the paging message following a definite number of radio frames.

The UE 110 may acquire the new uplink power control related system information and may apply the updated information in the following BCCH modification period at the latest.

Some effects of various embodiments may be:

The mechanism for notification and update of uplink power control related system information may be significantly improved in terms of latency about 50% compared with the conventional LTE mechanism.

The possible performance degradation in the uplink can be significantly reduced due to improved power control related system information update.

The UE may be informed about changes in uplink power control related system information.

Without loss of generality the following configuration is considered in the following implementations of the embodiments:

An LTE mobile radio cell operating in full-duplex FDD mode.

The UE 110 and the eNodeB 106 are in RRC connected mode, i.e. user data and control data may be transmitted in UL and DL via PUSCH 412 and PDSCH 416, respectively.

UL power control for PUSCH 412 transmission in subframe #i is performed according to following formula:

$$P_{PUSCH}(i) = \min\{P_{MAX}, 10 \log_{10}(M_{PUSCH}(i)) + P_{O\_PUSCH}(j) + \alpha \cdot PL + \Delta_{TF}(i) + f(i)\} [dBm].$$

The TPC commands $\delta_{PUSCH}$ are signaled on PDCCH 420 DCI format #0, #3, #3A.

The two mobile radio cell-specific power control parameters $P_{0\_NOMINAL\_PUSCH}(j)$, $\alpha$ are broadcast on SIB Type 2.

Figure 8:
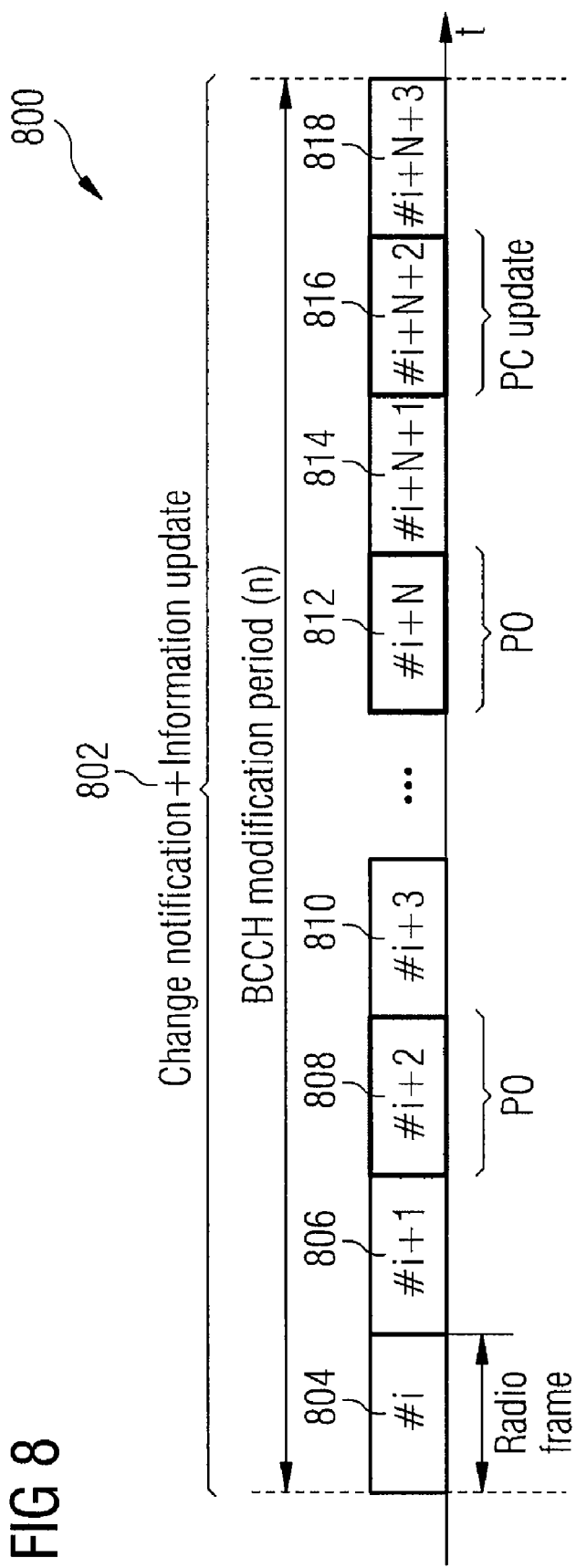
FIG. 8 shows the notification and update of UL power control related system information in accordance with an embodiment.

For the notification and update of UL power control related system information a BCCH modification period length may be defined including two cell-specific paging occasions according to FIG. 8.

FIG. 8 shows the notification and update of UL power control related system information in accordance with an embodiment in a timing diagram 800. In FIG. 8, a change notification and information update time period 802 of a length of one BCCH modification period is shown. Furthermore, FIG. 8 shows a plurality of radio frames 804, 806, 808, 810, 812, 814, 816, 818.

Figure 9:
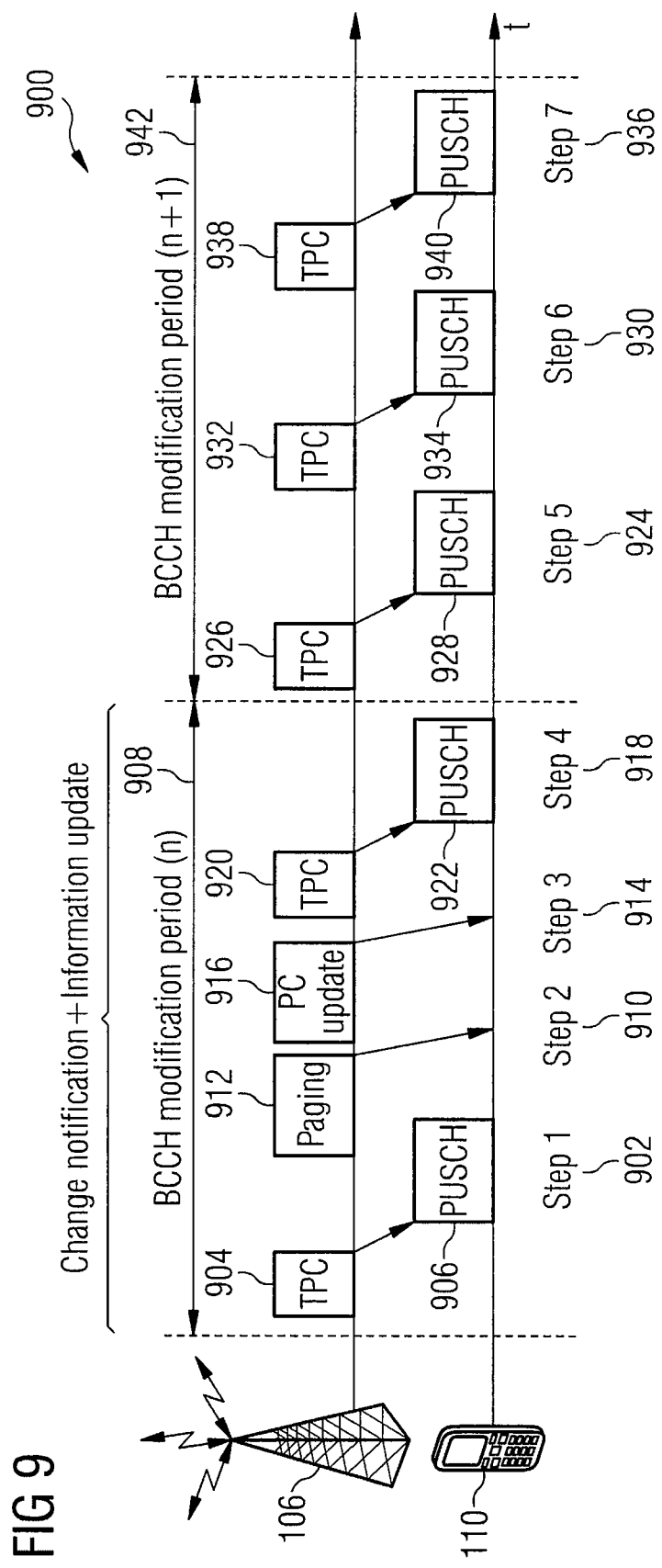
FIG. 9 shows the interaction between notification and update of uplink power control related system information and UL power control for PUSCH in accordance with an embodiment.

In an implementation, it is assumed that the communication network has decided to adapt the uplink power control operation for all RRC connected mode UEs 110 located in the mobile radio cell 106 due to the current high traffic load in the mobile radio cell 106. Then, the notification and update of the mobile radio cell-specific UL power control parameters $P_{0\_NOMINAL\_PUSCH}(j)$, $\alpha$ is performed according to a message flow diagram 900 as shown in FIG. 9.

In step 1 (denoted with reference number 902) (in step 1 902, a first TPC command message 904 is transmitted from the eNodeB 106 to the UE 110, and the UE 110 uses the information included in the first TPC command message 904 for a first PUSCH transmission 906) uplink power control for PUSCH transmission 906 is performed based on current valid system information stored in the UE 110.

In a first BCCH modification period(n) 908, the UE 110 checks the PDCCH 420 at the specified two (in alternative embodiments one, three, four, or even more) cell-specific paging occasions, which (has) have previously been specified, e.g. by the communication network, e.g. signaled by the mobile radio base station such as e.g. the eNodeB 106. Referring back to FIG. 8, two radio frames, e.g. the third radio frame #i+2 808 and the (N+1)-th radio frame #i+N 812 are predefined (e.g. by the communication network) as the paging occasions.

Furthermore, in step 2 (denoted with reference number 910), the UE 110 may be notified at the two paging occasions by a paging message 912 (sent e.g. via the PDSCH 416) (generated and sent by the mobile radio base station such as e.g. the eNodeB 106) including the information element systemInfoModificationUL-PC for indicating the change of uplink power control related system information in SIB Type 2 that will be transmitted later, as will be described in more detail below. Further, the paging message 912 may carry the scheduling information of the uplink power control related system information to be updated. The paging message 912 may be sent in the third radio frame #i+2 808 or in the (N+1)-th radio frame #i+N 812 as shown in FIG. 8 in an embodiment.

In step 3 (denoted with reference number 914), the updated uplink power control related system information of SIB Type 2 is transmitted on a downlink shared channel such as e.g. the DL-SCH 426/PDSCH 416 in a power control update message 916 in accordance with the scheduling information included in the received paging message 912 and in the same BCCH modification period(n) 908 following the paging message 912. In an embodiment, the power control update message 916 may be sent in the (N+3)-th radio frame #i+N+2 816 as shown in FIG. 8. The power control update message 916 carries new values of the two mobile radio cell-specific power control parameters $P_{0\_NOMINAL\_PUSCH}(j)$, $\alpha$ and UE 110 acquires and stores both parameters.

In step 4 (denoted with reference number 918), a second TPC command message 920 is transmitted from the eNodeB 106 to the UE 110, and the UE 110 uses the information included in the second TPC command message 920 for a second PUSCH transmission 922).

If possible the updated power control information may be applied already in the BCCH modification period(n) 908 (step 4 918) for PUSCH signal transmission 922, otherwise the updated power control information may be applied in the following BCCH modification period(n+1) 942 at the latest (step 5 (denoted with reference number 924) (in step 5, a third TPC command message 926 is transmitted from the eNodeB 106 to the UE 110, and the UE 110 uses the information included in the third TPC command message 926 for a third PUSCH transmission 928), in step 6 (denoted with reference number 930) (in step 6, a fourth TPC command message 932 is transmitted from the eNodeB 106 to the UE 110, and the UE 110 uses the information included in the fourth TPC command message 932 for a fourth PUSCH transmission 934), and in step 7 (denoted with reference number 936) (in step 7, a fifth TPC command message 938 is transmitted from the eNodeB 106 to the UE 110, and the UE 110 uses the information included in the fifth TPC command message 938 for a fifth PUSCH transmission 938)).

Figure 10:
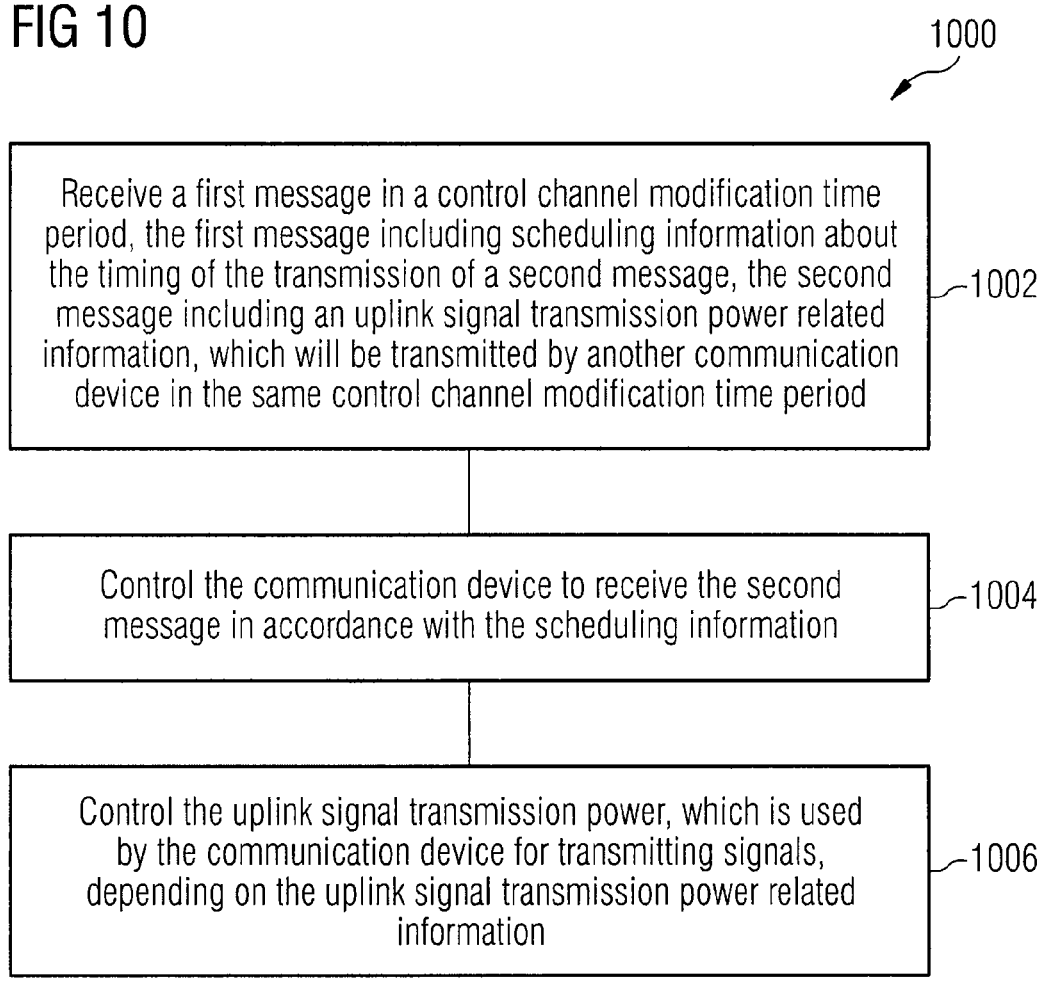
FIG. 10 shows a method for controlling an uplink signal transmission power in a communication device in accordance with an embodiment.

FIG. 10 shows a method 1000 for controlling an uplink signal transmission power in a communication device in accordance with an embodiment. In 1002, a first message is received in a control channel modification time period, wherein the first message includes scheduling information about the timing of the transmission of a second message, wherein the second message includes an uplink signal transmission power related information, which will be transmitted by another communication device in the same control channel modification time period. In 1004, the communication device is controlled to receive the second message in accordance with the scheduling information. Furthermore, in 1006, the uplink signal transmission power, which is used by the communication device for transmitting signals, is controlled depending on the uplink signal transmission power related information.

In an example of this embodiment, the first message may be a paging message. In another example of this embodiment, the first message may be received via a radio interface. In yet another example of this embodiment, the communication device is a radio communication device, e.g. a mobile radio communication device. In yet another example of this embodiment, the communication device is a communication terminal device. In yet another example of this embodiment, the first message may be received in a control channel modification time period at a predefined first message receiving time. In yet another example of this embodiment, the first message may be received in a control channel modification time period at a predefined paging occasion. In yet another example of this embodiment, the first message may be received via a control channel, e.g. via a downlink control channel, e.g. via a physical downlink control channel. In yet another example of this embodiment, the second message is a system information block message. In yet another example of this embodiment, the second message is a system information block type 2 message. In yet another example of this embodiment, the second message may be received via a different (communication) channel, e.g. different physical channel, than the channel via which the first message is received. In yet another example of this embodiment, the second message may be received via a downlink shared channel, e.g. via a physical downlink shared channel. In yet another example of this embodiment, the uplink signal transmission power related information may be an uplink power control related system information. In yet another example of this embodiment, the other communication device is a radio communication device, e.g. a mobile radio communication device. In yet another example of this embodiment, the other communication device is a communication network device. In yet another example of this embodiment, the other communication device is a mobile radio base station. In yet another example of this embodiment, the control channel modification time period is a broadcast control channel modification time period. In yet another example of this embodiment, the method may further include transmitting signals using the uplink signal transmission power related information. In yet another example of this embodiment, the signals are transmitted via a radio interface.

Figure 11:
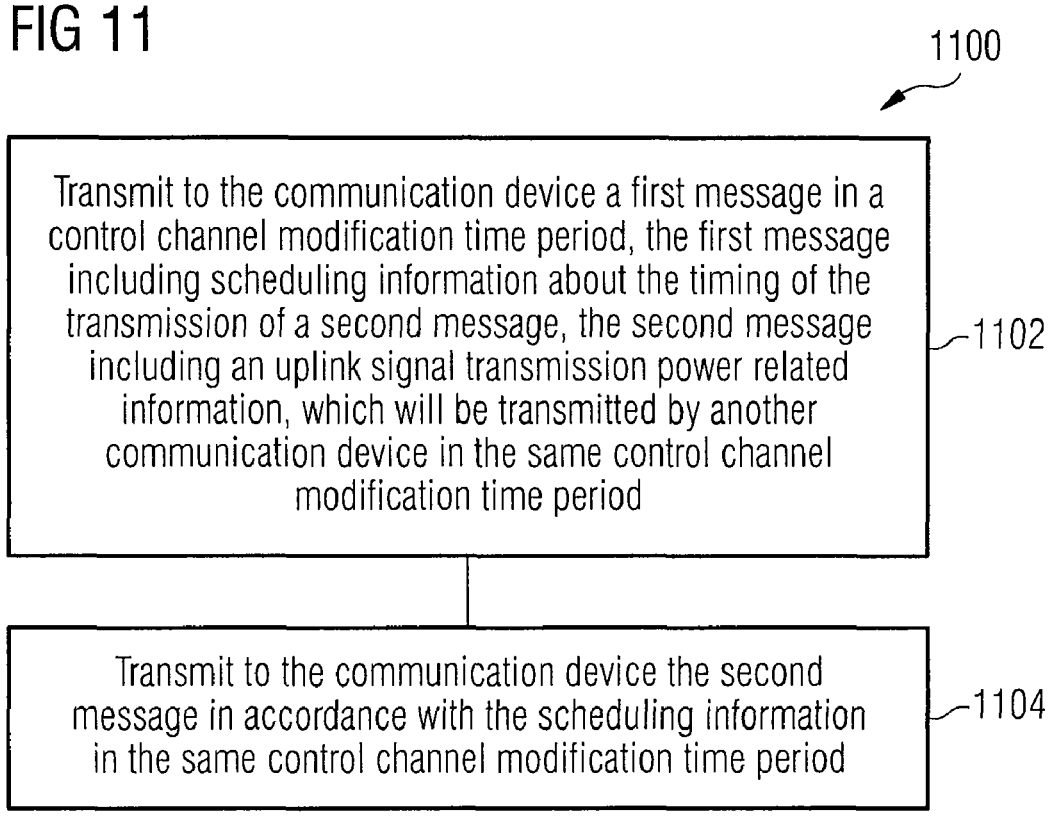
FIG. 11 shows a method for controlling an uplink signal transmission power in a communication device in accordance with another embodiment.

FIG. 11 shows a method 1100 for controlling an uplink signal transmission power in a communication device in accordance with another embodiment. In 1102, a first message is transmitted to the communication device in a control channel modification time period. The first message may include scheduling information about the timing of the transmission of a second message. The second message may include an uplink signal transmission power related information, which will be transmitted by another communication device in the same control channel modification time period. In 1104, the second message may be transmitted to the communication device in accordance with the scheduling information in the same control channel modification time period.

In an example of this embodiment, the first message may be a paging message. In another example of this embodiment, the first message may be transmitted via a radio interface. In yet another example of this embodiment, the communication device may be a radio communication device, e.g. a mobile radio communication device. In yet another example of this embodiment, the communication device is a communication terminal device. In yet another example of this embodiment, the first message may be transmitted in a control channel modification time period at a predefined paging occasion. In yet another example of this embodiment, the first message may be transmitted via a control channel, e.g. via a downlink control channel, e.g. via a physical downlink control channel. In yet another example of this embodiment, the second message is a system information block message, e.g. a system information block type 2 message. In yet another example of this embodiment, the second message may be transmitted via a different channel than the channel via which the first message is transmitted. In yet another example of this embodiment, the second message may be transmitted via a downlink shared channel, e.g. via a physical downlink shared channel. In yet another example of this embodiment, the uplink signal transmission power related information is an uplink power control related system information. In yet another example of this embodiment, the method may be carried out by a radio communication device, e.g. by a mobile radio communication device, e.g. by a communication network device, e.g. by a mobile radio base station. In yet another example of this embodiment, the control channel modification time period is a broadcast control channel modification time period.

Figure 12:
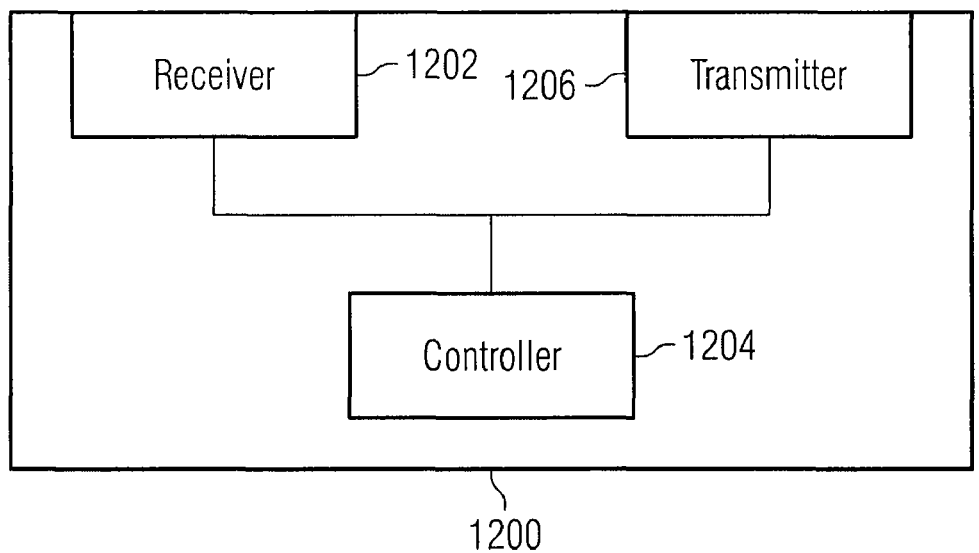
FIG. 12 shows a communication device in accordance with an embodiment.

FIG. 12 shows a communication device 1200 (e.g. implemented as the UE 110) in accordance with another embodiment. The communication device 1200 may include a receiver configured to receive a first message in a control channel modification time period, wherein the first message includes scheduling information about the timing of the transmission of a second message, wherein the second message includes an uplink signal transmission power related information, which will be transmitted by another communication device in the same control channel modification time period. Furthermore, the communication device 1200 may include a controller 1204. The controller 1204 may be configured to control the communication device 1200, e.g. the receiver 1202, to receive the second message in accordance with the scheduling information. Furthermore, the controller 1204 may be configured to control the uplink signal transmission power, which is used by the communication device for transmitting signals, depending on the uplink signal transmission power related information.

In an example of this embodiment, the first message may be a paging message, e.g. a mobile radio paging message. In another example of this embodiment, the receiver 1202 is configured to receive the first message via a radio interface. In yet another example of this embodiment, the communication device 1200 may be configured as a radio communication device, e.g. as a mobile radio communication device, e.g. as a communication terminal device. In yet another example of this embodiment, the receiver 1202 may be configured to receive the first message in a control channel modification time period at a predefined first message receiving time. In yet another example of this embodiment, the receiver 1202 may be configured to receive the first message in a control channel modification time period at a predefined paging occasion. In yet another example of this embodiment, the receiver 1202 may be configured to receive the first message via a control channel, e.g. via a downlink control channel, e.g. via a physical downlink control channel. In yet another example of this embodiment, the second message is a system information block message, e.g. a system information block type 2 message. In yet another example of this embodiment, the receiver 1202 may be configured to receive the second message via a different channel (e.g. different physical channel) than the channel via which the first message is received. In yet another example of this embodiment, the receiver 1202 may be configured to receive the second message via a downlink shared channel, e.g. via a physical downlink shared channel. In yet another example of this embodiment, the uplink signal transmission power related information is an uplink power control related system information. In yet another example of this embodiment, the other communication device is a radio communication device, e.g. a mobile radio communication device. In yet another example of this embodiment, the other communication device is a communication network device, e.g. a mobile radio base station. In yet another example of this embodiment, the control channel modification time period is a broadcast control channel modification time period. In yet another example of this embodiment, the communication device 1200 may further include a transmitter 1206 configured to transmit signals using the uplink signal transmission power related information. In yet another example of this embodiment, the transmitter 1206 may be configured to transmit signals via a radio interface.

Figure 13:
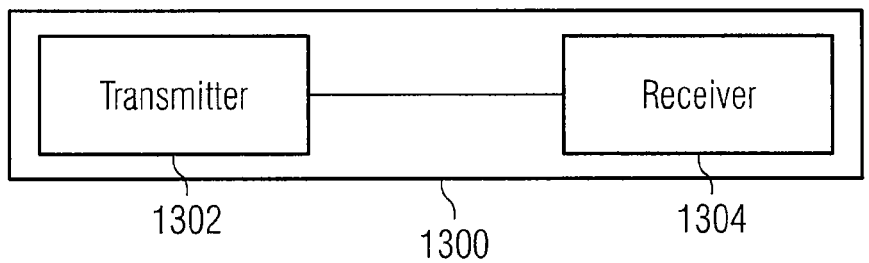
FIG. 13 shows a communication device in accordance with another embodiment.

FIG. 13 shows a communication device 1300 (e.g. implemented as the eNodeB 106) in accordance with another embodiment. The communication device 1300 may include a transmitter 1302 configured to transmit to another communication device a first message in a control channel modification time period, wherein the first message includes scheduling information about the timing of the transmission of a second message, wherein the second message includes an uplink signal transmission power related information, which will be transmitted by the communication device in the same control channel modification time period. Furthermore, the transmitter 1302 may be configured to transmit to the other communication device the second message in accordance with the scheduling information in the same control channel modification time period. Furthermore, the communication device 1300 may optionally include a receiver 1304 configured to receive signals from another communication device. The additional components which are usually included in a communication device such as a base station, are also provided in the communication device 1300, however, are not shown for reasons of clarity.

In an example of this embodiment, the first message may be a paging message. In another example of this embodiment, the transmitter 1302 may be configured to transmit the first message via a radio interface. In yet another example of this embodiment, the other communication device is a radio communication device, e.g. a mobile radio communication device. In yet another example of this embodiment, the other communication device is a communication terminal device. In yet another example of this embodiment, the transmitter 1302 may be configured to transmit the first message in a control channel modification time period at a predefined paging occasion. In yet another example of this embodiment, the transmitter 1302 may be configured to transmit the first message via a control channel, e.g. via a downlink control channel, e.g. via a physical downlink control channel. In yet another example of this embodiment, the second message is a system information block message, e.g. a system information block type 2 message. In yet another example of this embodiment, the transmitter 1302 may be configured to transmit the second message via a different channel (e.g. communication channel, e.g. physical channel) than the channel via which the first message is transmitted. In yet another example of this embodiment, the transmitter 1302 may be configured to transmit the second message via a downlink shared channel, e.g. via a physical downlink shared channel. In yet another example of this embodiment, the uplink signal transmission power related information is an uplink power control related system information. In yet another example of this embodiment, the communication device may be configured as a radio communication device, e.g. as a mobile radio communication device. In yet another example of this embodiment, the communication device may be configured as a communication network device, e.g. as a mobile radio base station. In yet another example of this embodiment, the control channel modification time period is a broadcast control channel modification time period.

Figure 14:
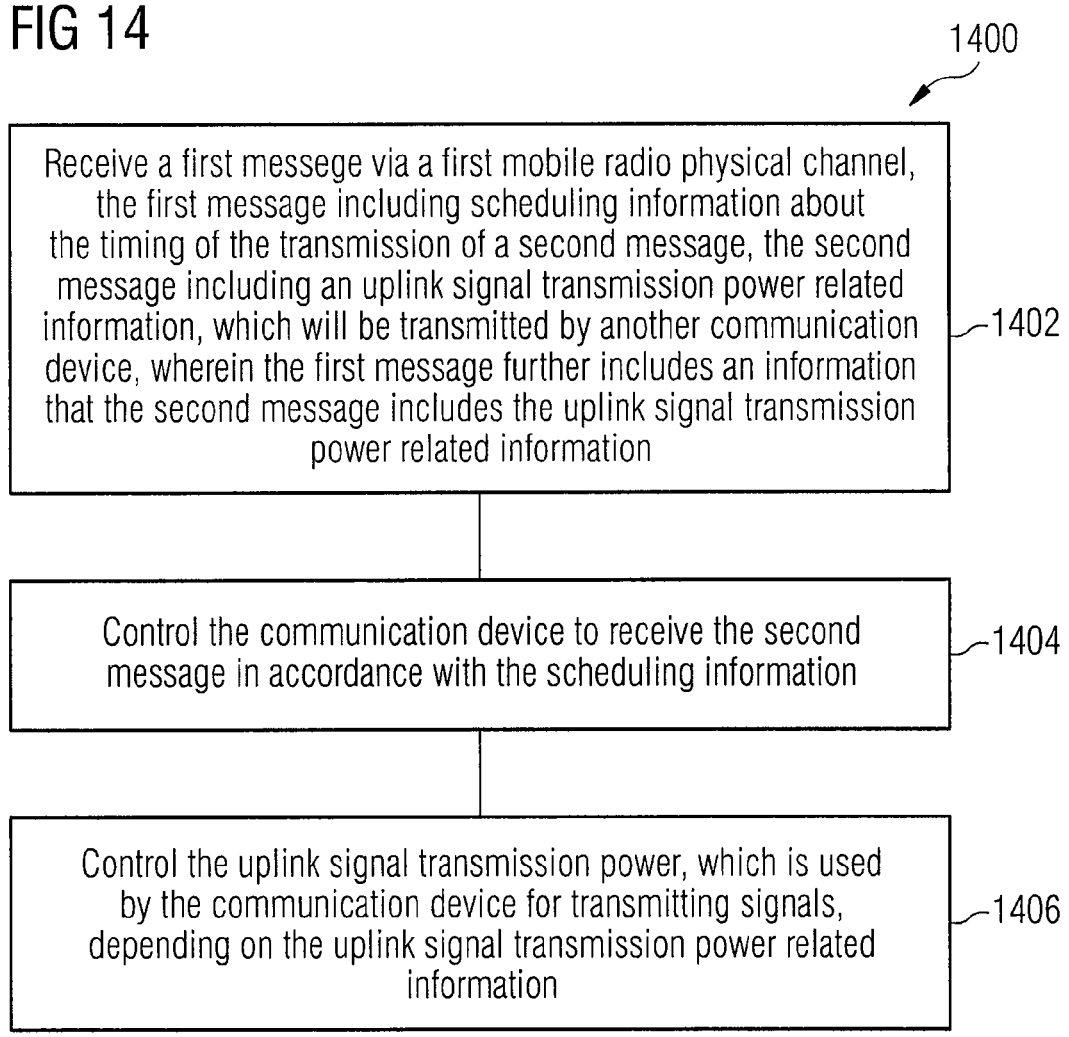
FIG. 14 shows a method for controlling an uplink signal transmission power in a communication device in accordance with yet another embodiment.

FIG. 14 shows a method 1400 for controlling an uplink signal transmission power in a communication device in accordance with yet another embodiment. In 1402, a first message may be received via a first mobile radio physical channel, wherein the first message includes scheduling information about the timing of the transmission of a second message, wherein the second message includes an uplink signal transmission power related information, which will be transmitted by another communication device, wherein the first message further includes an information that the second message includes the uplink signal transmission power related information. In 1404, the communication device may be controlled to receive the second message in accordance with the scheduling information. In 1406, the uplink signal transmission power may be controlled, which is used by the communication device for transmitting signals, depending on the uplink signal transmission power related information.

In various embodiments, mobile radio cell-specific paging occasions may be defined within the length of a BCCH modification period and a new information element referred to as systemInfoModificationUL-PC may be introduced in the paging message for indicating the change of uplink power control related system information.

Furthermore, in various embodiments, the updated uplink power control related system information may be transmitted on DL-SCH/PDSCH in accordance with the scheduling information and in the same BCCH modification period as the paging message following a definite number of radio frames.

Moreover, in various embodiments, the UE 110 may acquire the new uplink power control related system information and may apply the updated information in the following (immediately subsequent in time) BCCH modification period at the latest.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for controlling an uplink signal transmission power in a first communication device, the method comprising:
receiving a first message in a control channel modification time period, the first message comprising scheduling information about the timing of the transmission of a second message, the second message comprising an uplink signal transmission power related information, which will be transmitted by a second communication device in the control channel modification time period;
controlling the first communication device to receive the second message in accordance with the scheduling information; and
controlling the uplink signal transmission power, which is used by the first communication device for transmitting signals, depending on the uplink signal transmission power related information.

2. The method of claim 1,
wherein the first message is a paging message.

3. The method of claim 1,
wherein the first message is received in the control channel modification time period at a predefined first message receiving time.

4. The method of claim 3,
wherein the first message is received in the control channel modification time period at a predefined paging occasion.

5. The method of claim 1,
wherein the first message is received via a control channel.

6. The method of claim 1,
wherein the second message is a system information block message.

7. The method of claim 1,
wherein the second message is received via a different channel than the channel via which the first message is received.

8. The method of claim 1,
wherein the control channel modification time period is a broadcast control channel modification time period.

9. The method of claim 1,
wherein the controlling the uplink signal transmission power depending on the uplink signal transmission power related information is carried out in the control channel modification time period.

10. The method of claim 1,
wherein the controlling the uplink signal transmission power depending on the uplink signal transmission power related information is carried out in the control channel modification time period immediately succeeding the control channel modification time period, in which the first message and the second message have been received.

11. A method for controlling an uplink signal transmission power in a first communication device, the method comprising:
    transmitting to the first communication device a first message in a control channel modification time period, the first message comprising scheduling information about the timing of the transmission of a second message, the second message comprising an uplink signal transmission power related information, which will be transmitted by a second communication device in the control channel modification time period;
    transmitting to the first communication device the second message in accordance with the scheduling information in the control channel modification time period.

12. The method of claim 11,
wherein the first message is a paging message.

13. The method of claim 11,
wherein the first message is transmitted in a control channel modification time period at a predefined paging occasion.

14. The method of claim 11,
wherein the second message is a system information block message.

15. A first communication device, comprising:
    a receiver configured to receive a first message in a control channel modification time period, the first message comprising scheduling information about the timing of the transmission of a second message, the second message comprising an uplink signal transmission power related information, which will be transmitted by a second communication device in the control channel modification time period; and
    a controller configured to
        control the first communication device to receive the second message in accordance with the scheduling information;
        control the uplink signal transmission power, which is used by the first communication device for transmitting signals, depending on the uplink signal transmission power related information.

16. The first communication device of claim 15,
wherein the first message is a paging message.

17. The first communication device of claim 15,
being configured as a radio communication device.

18. The first communication device of claim 17,
being configured as a radio communication terminal device.

19. The first communication device of claim 15,
wherein the receiver is configured to receive the first message in a control channel modification time period at a predefined first message receiving time.

20. The first communication device of claim 15,
wherein the second message is a system information block message.

21. A first communication device, comprising:
a transmitter configured to
    transmit to a second communication device a first message in a control channel modification time period, the first message comprising scheduling information about the timing of the transmission of a second message, the second message comprising an uplink signal transmission power related information, which will be transmitted by the first communication device in the control channel modification time period; and
    transmit to the second communication device the second message in accordance with the scheduling information in the control channel modification time period.

22. The first communication device of claim 21,
wherein the transmitter is configured to transmit the first message in a control channel modification time period at a predefined paging occasion.

23. The first communication device of claim 21,
being configured as a radio communication device.

24. The first communication device of claim 23,
being configured as a radio communication network device.

25. A method for controlling an uplink signal transmission power in a first communication device, the method comprising:
    receiving a first message via a first mobile radio physical channel, the first message comprising scheduling information about the timing of the transmission of a second message which will be transmitted by a second communication device and comprises an uplink signal transmission power related information;
    controlling the first communication device to receive the second message in accordance with the scheduling information; and
    controlling the uplink signal transmission power, which is used by the first communication device for transmitting signals, depending on the uplink signal transmission power related information.

* * * * *

UNITED STATES PATENT AND TRADEMARK OFFICE
CERTIFICATE OF CORRECTION

PATENT NO. : 8,311,053 B2
APPLICATION NO. : 12/210571
DATED : November 13, 2012
INVENTOR(S) : Hyung-Nam Choi Page 1 of 1

It is certified that error appears in the above-identified patent and that said Letters Patent is hereby corrected as shown below:

On the title page item (73), delete "INFINEON TECHNOLOGIES AG" and add:

(73) Assignee: INTEL MOBILE COMMUNICATIONS GMBH

Signed and Sealed this
Twenty-second Day of January, 2013

David J. Kappos
*Director of the United States Patent and Trademark Office*